United States Patent
Brown

(10) Patent No.: US 8,430,209 B2
(45) Date of Patent: Apr. 30, 2013

(54) ARTICULATED VEHICLE

(75) Inventor: Frederick Leslie Brown, Nr. Evesham (GB)

(73) Assignee: Translift Bendi Limited, Redditch, Worcestershire (GB)

( * ) Notice: Subject to any disclaimer, the term of this patent is extended or adjusted under 35 U.S.C. 154(b) by 56 days.

(21) Appl. No.: 13/133,509

(22) PCT Filed: Nov. 24, 2009

(86) PCT No.: PCT/GB2009/002743
§ 371 (c)(1),
(2), (4) Date: Jul. 14, 2011

(87) PCT Pub. No.: WO2010/067044
PCT Pub. Date: Jun. 17, 2010

(65) Prior Publication Data
US 2011/0262254 A1    Oct. 27, 2011

(30) Foreign Application Priority Data
Dec. 11, 2008 (GB) .................................... 0822585.6

(51) Int. Cl.
*B66F 9/10* (2006.01)
*B66F 9/075* (2006.01)

(52) U.S. Cl.
USPC ........... 187/222; 180/210; 180/233; 180/418; 280/400

(58) Field of Classification Search ................... 280/400; 180/418; 187/222
See application file for complete search history.

(56) References Cited

U.S. PATENT DOCUMENTS

| | | | | |
|---|---|---|---|---|
| 2,284,237 A | * | 5/1942 | Stevenson | ................ 414/633 |
| 4,218,170 A | | 8/1980 | Goodacre | |
| 5,957,497 A | | 9/1999 | Johansson et al. | |

FOREIGN PATENT DOCUMENTS

| | | |
|---|---|---|
| EP | 1 223 142 A3 | 7/2002 |
| GB | 2 144 087 A | 2/1985 |
| GB | 2 255 941 A | 11/1992 |
| GB | 2 320 473 A | 6/1998 |
| GB | 2 321 049 | 7/1998 |
| WO | 2004/106216 A1 | 12/2004 |

* cited by examiner

*Primary Examiner* — Tashiana Adams
*Assistant Examiner* — Conan Duda
(74) *Attorney, Agent, or Firm* — Davis & Bujold, PLLC

(57) ABSTRACT

An articulated vehicle has front and rear sections that are connected via a vertically pivot, and the front section has one or more front wheels that pivot a horizontal plane. A first sprocket is mounted on a vertical axis, for movement with the front section, the axis of the first sprocket is offset from the axis of the pivot between the front and rear sections, a shaft transmit angular movement at a ratio of 1:1 and in the same direction from the front wheel or wheels to the first sprocket, and a second sprocket is mounted on the rear section of the vehicle coaxially of the axis of the pivot between the front and rear sections. The second sprocket is drivingly connected to a rotary sensor, the first and second sprockets are drivingly connected by way of a chain, and the first and second sprockets having a drive ratio of 1:1.

9 Claims, 4 Drawing Sheets

ARTICULATED VEHICLE

This application is a National Stage completion of PCT/GB2009/002743 filed Nov. 24, 2009, which claims priority from British patent application serial no. 0822585.6 filed Dec. 11, 2008.

FIELD OF THE INVENTION

The present invention relates to articulated vehicles and in particular to articulated vehicles, for example articulated lift trucks, having one or more wheels mounted on a front section of the vehicle, with independent means for pivoting the front section relative to a rear section in a horizontal plane and for pivoting the front wheels relative to the front section of the vehicle in a horizontal plane.

BACKGROUND OF THE INVENTION

With such vehicles, when the front wheels are pivoted relative to the front section in order to steer the vehicle, the actual steering angle will be modified by the angle of articulation between the front and rear sections of the vehicle.

When driving vehicles of this type, it is necessary to measure the actual steering angle, that is the angle of the front wheels relative to the rear section of the vehicle, in order to control the speeds of the rear driven wheels of the vehicle and provide differential control of the rear wheels when cornering. It is also necessary to let the operator of the vehicle know the direction in which the front wheels are positioned, when starting the vehicle from rest.

Hitherto, this has been achieved by means of separate sensors which measure the angle of articulation and the angle of the front wheels relative to the front section, and calculating from the two measurements, the actual steering angle. This requires some processing power.

SUMMARY OF THE INVENTION

The present invention provides means for measuring the steering angle directly, using a single sensor.

According to one aspect of the present invention an articulated vehicle comprises a rear section and a front section mounted to the rear section by means of a vertically extending pivot, the front section having one or more front wheels mounted for pivotal movement in a horizontal plane, characterized in that a first sprocket is mounted on a vertical axis, for movement with the front section, the axis of the first sprocket being offset from the axis of the pivot between the front and rear sections, means to transmit angular movement at a ratio of 1:1 and in the same direction, from the front wheel or wheels to the first sprocket, a second sprocket mounted on the rear section of the vehicle coaxially of the axis of the pivot between the front and rear sections, the second sprocket being drivingly connected to a rotary sensor, the first and second sprockets being drivingly connected by means of a chain, the first and second sprockets having a drive ratio of 1:1.

In accordance with the present invention, movement of the front wheels relative to the front section of the vehicle will be transmitted via the first sprocket and chain drive to the sensor which will provide a measure of the angle through which the front wheel or wheels have turned. When the front section of the vehicle pivots relative to the rear section, first sprocket will describe an arc around the pivot axis between the front and rear sections. This movement of first sprocket will be transmitted to the second sprocket and sensor by the chain drive: rotation of the front section in the same direction as the front wheels adding to the angle measured corresponding to movement of the front wheel or wheels: and rotation of the front section in the opposite direction to the front wheels being subtracted from the angle measured corresponding to movement of the front wheel or wheels. In this manner a single sensor will provide a direct measurement of the actual steering angle.

According to one embodiment of the invention, the means for transmitting angular movement of the front wheel or wheels to the first sprocket comprises a shaft mounted for rotation with the front wheel or wheels, the first sprocket being mounted for rotation with the shaft.

BRIEF DESCRIPTION OF THE DRAWINGS

The invention is now described, by way of example only, with reference to the accompanying drawings, in which:—

DETAILED DESCRIPTION OF THE PREFERRED EMBODIMENTS

Figure 1:
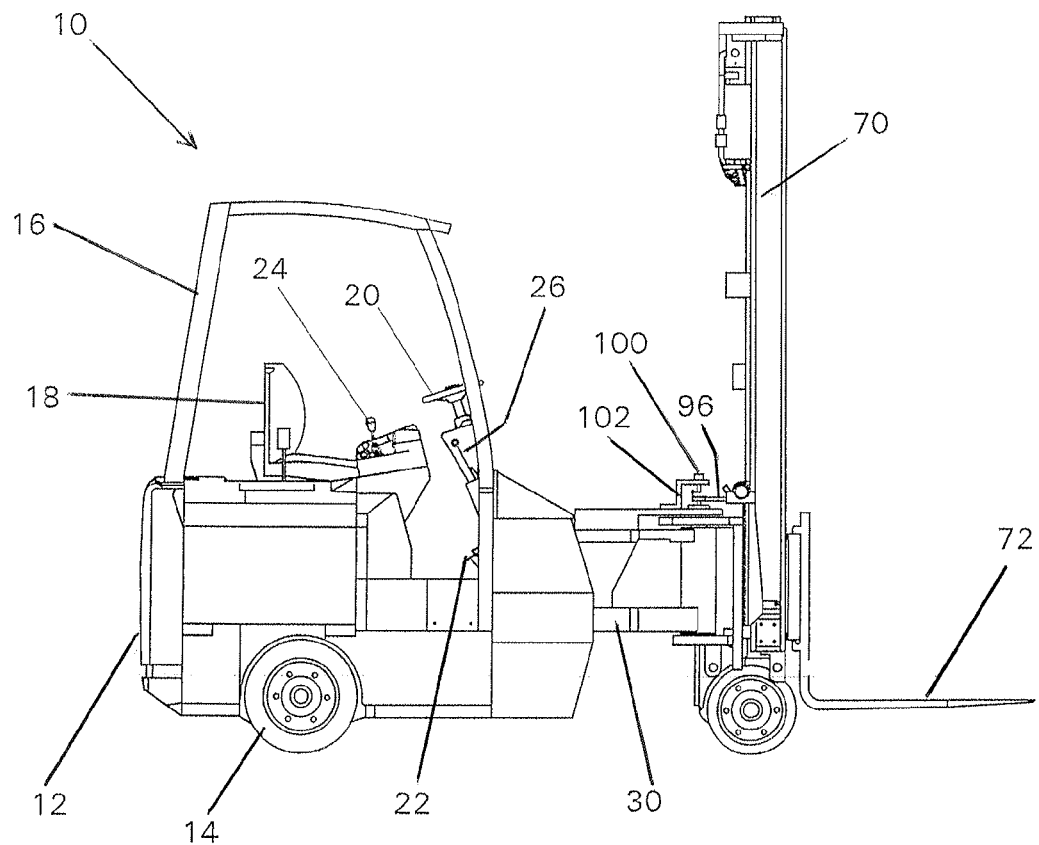
FIG. 1 is a diagrammatic side elevation of an articulated lift truck in accordance with the present invention.
Figure 2:
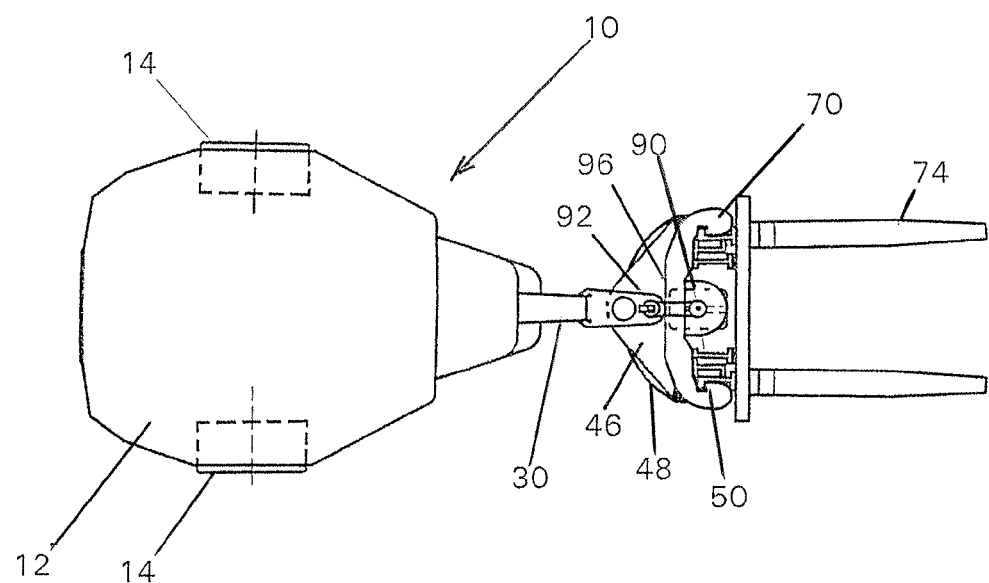
FIG. 2 is a diagrammatic plan view of the lift truck illustrated in FIG. 1.

As illustrated in FIGS. 1 and 2, an articulated fork lift truck 10 has a rear section 12 having a pair of rear ground engaging wheels 14 mounted on a fixed transverse axle. The rear wheels 14 are driven by independent drive means, for example electric or hydraulic motors (not shown). Drive to the rear wheels 14 may be controlled independently to provide differential control when the lift truck 10 is cornering.

The rear section 12 of the lift truck 10 defines a cab 16 having a seat 18, a steering wheel 20, drive control pedals 22, a lift mechanism control lever 24 and an articulation lever 26. The rear section 12 also houses a power source, for example internal combustion engine that may drive a hydraulic pump or generator, or a battery pack. Counter balance weights are also carried towards the rear of the rear section 12.

An arm 30 extends forwardly from the front of the rear section 12, a vertically extending bearing tube 32 being secured to the forward end of the arm 30.

Figure 3:
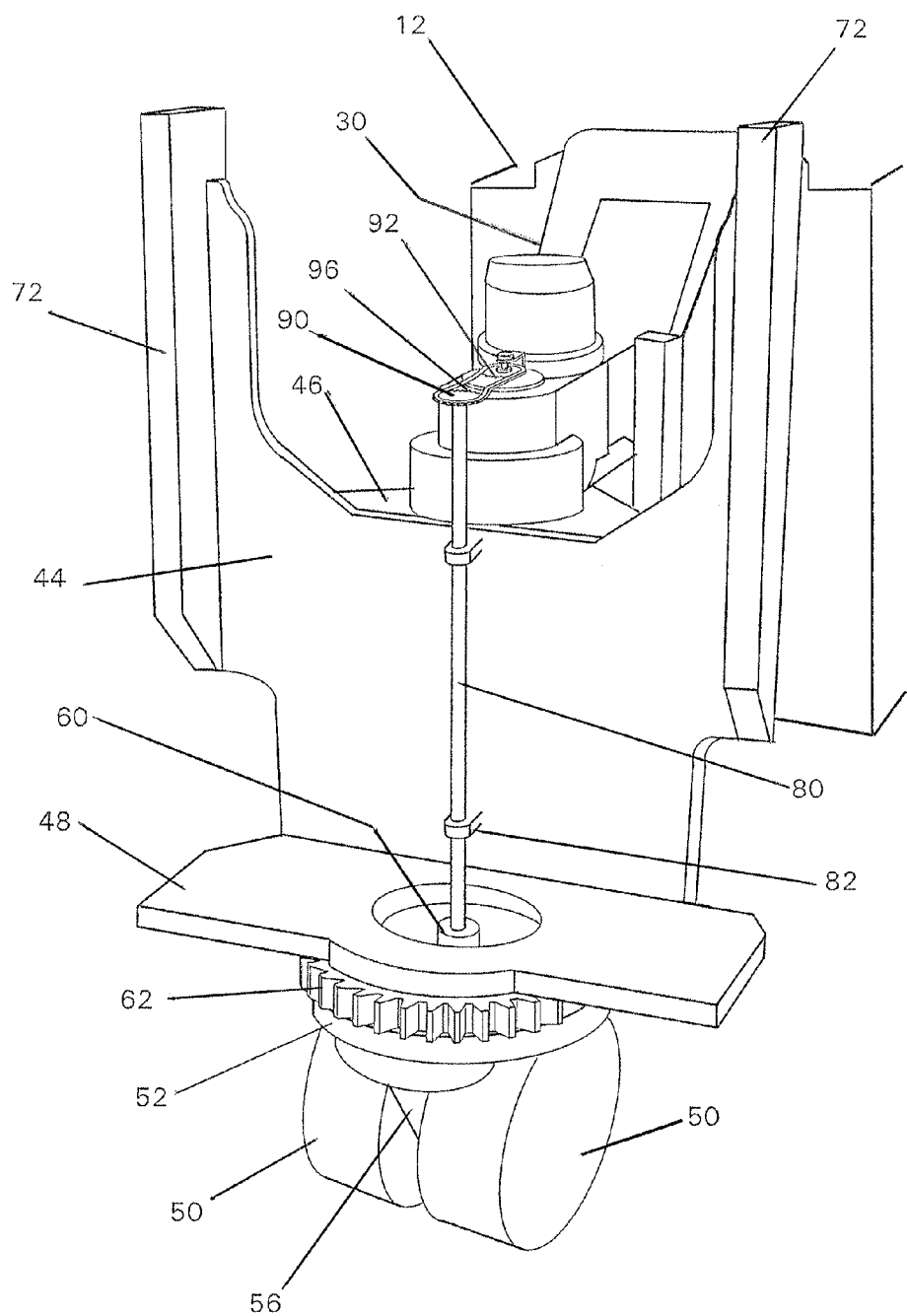
FIG. 3 is a perspective view of the front of the lift truck illustrated in FIG. 1, with the lift mast removed.
Figure 5:
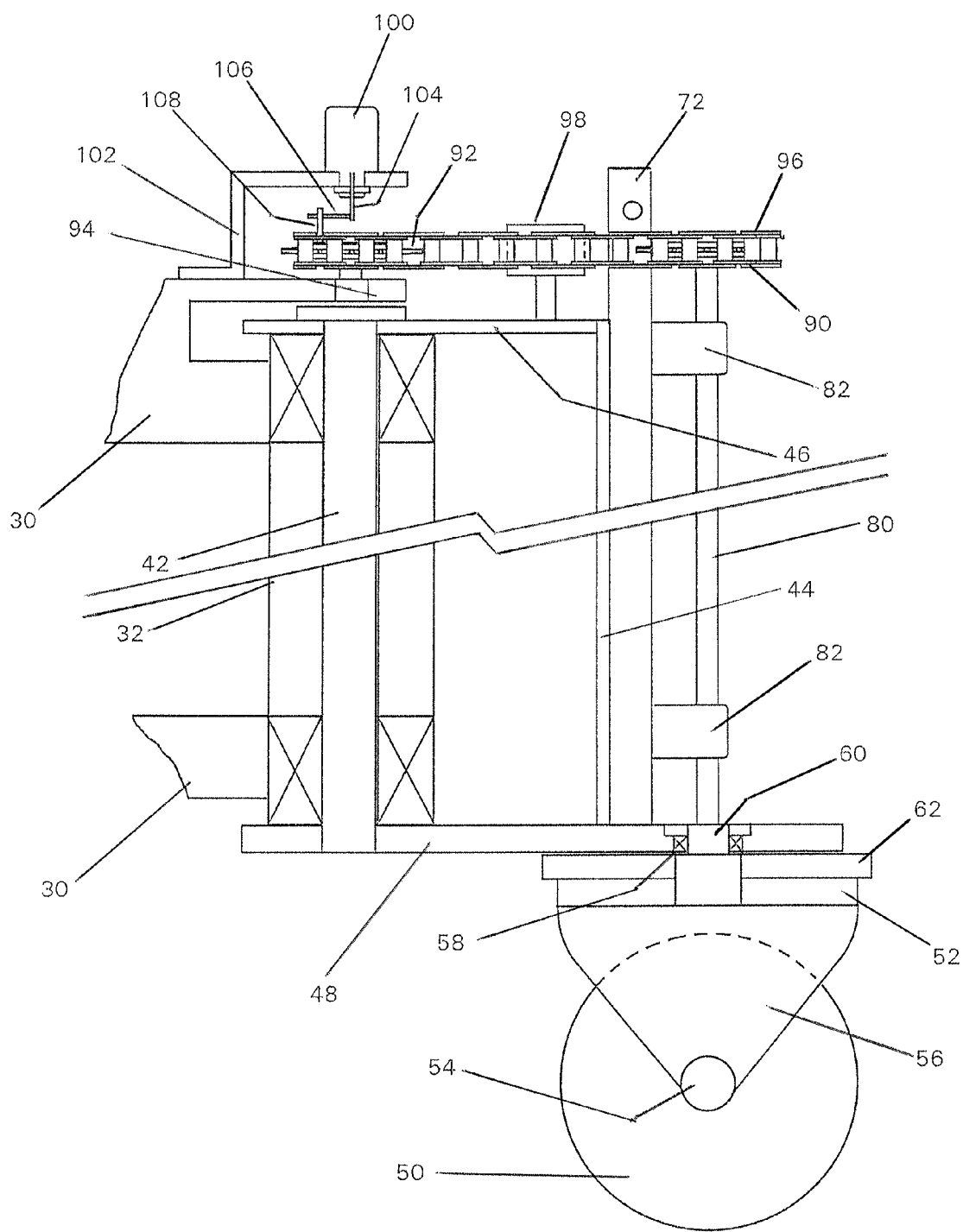
FIG. 5 is a detailed sectional side elevation of the central portion of the lift truck illustrated in FIG. 1.

A front section 40 is pivotally connected to the rear section 12 by means of pivot 42 which is rotatably mounted in the bearing tube 32. As illustrated in FIGS. 3 and 5, the front section 40 comprises a transverse vertically extending rear plate 44 with upper and lower horizontally plates 46, 48 extending rearwardly therefrom. The plates 46 and 48 extend one at each end of the bearing tube 32, the pivot 42 being secured between the plates 46, 48.

Drive means, for example a driven gear (not shown) secured to the front section 40 and a drive gear (not shown) driven by a hydraulic or electric motor 34, secured to the arm 30, are provided for pivoting the front section 40 relative to the rear section 12, under control of the articulation control lever 26. The front section 40 may be pivoted relative to the rear section in this manner, by 90° or more.

A lift mast 70 of conventional construction is mounted on vertically extending bars 72 secured to the rear plate 44, in conventional manner. A pair of forks 74 is mounted on the lift mast, for movement vertically thereof.

The lower plate 48 extends forwardly of rear plate 44. A pair of closely spaced front wheels 50 are mounted on a turntable 52, by means of an axle 54 mounted of a central bracket 56 depending from a turntable 52. The turntable 52 is secured to the underside of the forward portion of lower plate 48, for rotation relative thereto, on a vertical shaft 60, the shaft 60 is located axially relative to the plate 48, in a bearing 58 and rotates with the turntable 52. A driven gear 62 is non-rotatably mounted on the turntable 52 and is engaged by a drive gear driven by a hydraulic or electric steering motor (not shown), to rotate the front wheels 50 and shaft 60 about a vertical axis.

A shaft 80 is drivingly coupled directly to the shaft 60 and extends vertically thereof to a level above the level of the upper plate 46. The shaft 80 is mounted in bearings 82 secured to the rear plate 44, so that it will rotate with the front section 40 about the axis of pivot 42. A chain sprocket 90 is secured to the upper end of the shaft 80 for rotation therewith.

A second chain sprocket 92 is mounted for rotation on a vertical stub axle 94 mounted coaxially of the axis of pivot 42 on a portion of the arm 30 which overlies plate 46. The sprockets 90, 92 are located in a common horizontal plane and are drivingly connected by a chain 96. A chain tensioner 98 is mounted on the front section 40 and resiliently engages the chain 96 to maintain the chain 96 at the required tension.

A potentiometer 100 or similar sensor, which will provide a measure of the angular movement of sprocket 92 is located coaxially of sprocket 92, on a bracket 102 secured to arm 30 and overlying the sprocket 92. A shaft 104 driving a rotor on the potentiometer 100 is drivingly coupled to the sprocket 92 by means of a radially extending arm 106 which engages between a pair of studs 108 extending from the upper face of the sprocket 92. Other means capable of accommodating misalignment of the second sprocket 92 and sensor 100 may be used to couple the second sprocket 92 to the sensor 100.

The sprockets 90, 92 are of the same size so that the drive ratio between the shaft 80 and potentiometer 100 is 1:1.

Figure 4:
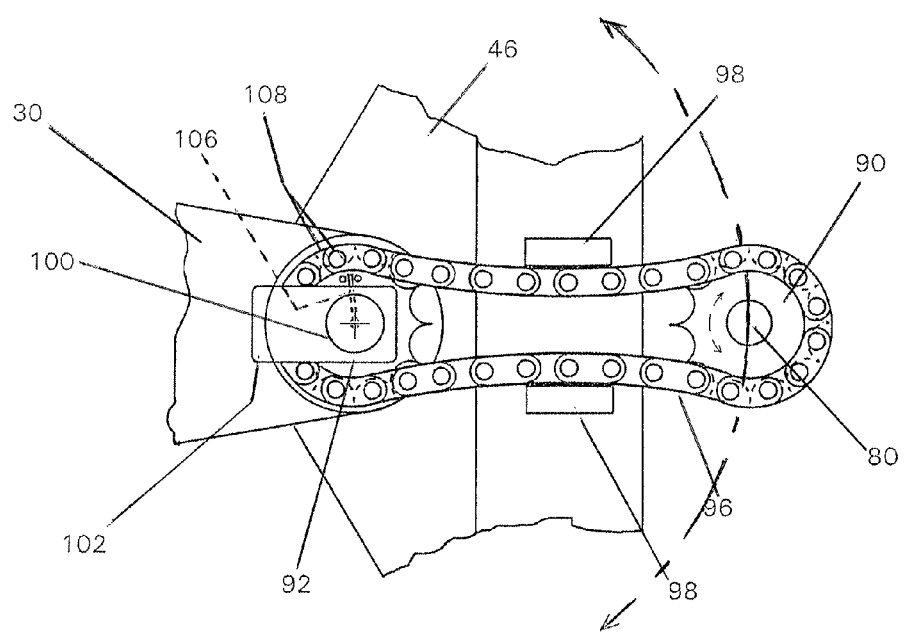
FIG. 4 is a detailed plan view of a steering angle sensor assembly of the lift truck illustrated in FIG. 1.

The vehicle described above is steered by means of the steering wheel 20 which controls the steering motor to turn the front wheels 50 about a vertical axis. Rotation of the turntable 52 and shaft 60 is transmitted to shaft 80, chain sprocket 90, chain sprocket 92 via chain 96 and via the studs 108 and arm 106 to the rotor of the potentiometer 100, so that the potentiometer 100 will provide a signal corresponding to the angle through which the front wheels 50 have turned relative to the front section 40. As long as the front section 40 is aligned longitudinally with the rear section 12, the angle so measured will be the actual steering angle. However if the front section 40 is pivoted relative to the rear section 12 the actual steering angle will be either increased, if the front section 40 is pivoted in the same direction as the wheels 50, or decreased, if the front section 40 is pivoted in the opposite direction to the wheels 50. Upon articulation of the front and rear sections 40, 12 in this manner, the shaft 80 and sprocket 90 will describe an arc about the axis of pivot 42, as shown in broken line in FIG. 4. Movement of sprocket 90 in this manner will cause the chain 96 to be moved through a segment corresponding to the angle of movement of the front section 40 relative to the rear section 12, rotating sprocket 92 and the rotor of potentiometer 100 by the same angle. If consequently the front wheels 50 are turned at an angle $\alpha$ relative to the front section 40 and the front section 40 is turned at an angle $\beta$ relative to the rear section 12 in the same direction, the sprocket 92 and rotor of the potentiometer 100, will turn through an angle $\alpha+\beta$ which is the actual steering angle. Similarly if the wheels 50 and front section 40 are turned by at angles $\alpha$ and $\beta$ but in opposite directions, the sprocket 92 and rotor of the potentiometer 100 will be turned through an angle of $\alpha-\beta$, equal to the actual steering angle. The potentiometer 100 will consequently provide a measure of the actual steering angle, irrespective of the angle and direction in which the wheels 50 are turned relative to the front section 40 and the front section 40 is turned relative to the rear section 12.

The measurement of the actual steering angle may be used to control the power transmitted to each of the rear wheels 14, so that the wheels 14 may be driven differentially when the lift truck 14 is cornering. Additionally or alternatively, the measurement may be used to provide a continuous indication to the operator of the lift truck, of the direction in which the front wheels 50 are located.

Various modifications may be made without departing from the present invention. For example while in the above embodiment a ridged shaft 80 is used to transmit rotation of the wheels 50 to the sprocket 90. The shaft 80 may alternatively include flexible joints or be replaced by a flexible drive shaft, only the portion of shaft to which the sprocket 90 is secured, requiring to be located securely to the front section 40, parallel to and spaced from the axis of pivot 42. According to a further embodiment, angular movement of the front wheels may be sensed electronically, to control a motor to rotate the first sprocket through a corresponding angle.

The potentiometer 100 may also be replaced by other sensors, which will provide a measure of angular displacement. Any suitable coupling may be used between the sprocket 92 and sensor 100. However to coupling will preferably accommodate axial and angular misalignments of the components.

While in the embodiment described above, angular movement of the front wheels relative to the front section and of the front section relative to the rear section are controlled by the steering wheel 20 and articulation lever 26 respectively, alternatively a single control means, for example the steering wheel 20 may be used, in different modes, to control both angular movement of the front wheels relative to the front section and articulation of the front section relative to the rear section, switch means being provided to switch from one mode to the other.

The invention claimed is:

1. An articulated vehicle (10) comprising:
   a rear section (12) and a front section (40) mounted to the rear section (12) by means of a vertically extending pivot (42),
   the front section (40) having one of more front wheels (50) mounted for pivotal movement in a horizontal plane,
   a first sprocket (90) being mounted on a vertical axis for movement with the front section (40),
   the vertical axis of the first sprocket (90) being offset from an axis of the vertically extending pivot (42) between the front section and the rear sections (12, 40),
   a means (80) for transmitting angular movement at a ratio of 1:1 and in the same direction, from the one or more front wheels (50) to the first sprocket (90),
   a second sprocket (92) mounted on the rear section (12) of the vehicle coaxially of the axis of the vertically extending pivot (42) between the front and the rear sections (12, 40), the second sprocket (92) being drivingly connected to a rotary sensor (100),
   the first and the second sprockets (90, 92) being drivingly connected by means of a chain (96), and the first and the second sprockets (90, 92) having a drive ratio of 1:1.

2. The articulated vehicle (10) according to claim 1, wherein the rear section (12) has a pair of rear wheels (14) and the rear wheels (14) are driven independently, the rotary sensor (100) generating a signal corresponding to an actual steering angle of the one or more front wheels (50), the signal is used to control differential drive to the rear wheels (14) as a function of the actual steering angle measured by the rotary sensor (100).

3. The articulated vehicle (10) according to claim 1, wherein the sensor (100) is a potentiometer.

4. The articulated vehicle (10) according to claim 1, wherein a ridged shaft (80) transmits angular movement of the one or more front wheels (50) to the first sprocket (90), the shaft (80) is mounted on the front section (40), and the axis of the shaft (80) is parallel to and spaced from the axis of the vertically extending pivot (42) between the front and the rear sections (12, 40) of the vehicle (10).

5. The articulated vehicle (10) according to claim 4, wherein a flexible coupling is provided in the shaft (80) to accommodate any misalignment between the axis of rotation of the one or more front wheels (50) and the axis of the shaft (80).

6. The articulated vehicle (10) according to claim 1, wherein the means for transmitting angular movement from the one or more front wheels (50) to the first sprocket (90) is a flexible shaft, a portion of the flexible shaft remote from the one or more front wheels (50), to which the first sprocket (90) is secured, is mounted on the front section (40), parallel to the axis of the vertically extending pivot (42) between the front and the rear sections (12, 40) and spaced therefrom.

7. The articulated vehicle (10) according to claim 1, wherein a radial arm (106) on a rotor (104) of the sensor (100) engages between a pair of studs (108) projecting from an end face of the second sprocket (92) to couple the second sprocket (92) to the sensor (100).

8. The articulated vehicle (10) according to claim 7, wherein the vehicle (10) is an articulated fork lift truck.

9. An articulated fork lift truck (10) comprising:
a rear section (12) and a front section (40) mounted to the rear section (12) by a vertically extending pivot (42),
the front section (40) having one of more front wheels (50) mounted for pivotal movement in a horizontal plane,
a first sprocket (90) being mounted on a vertical axis for movement with the front section (40),
the vertical axis of the first sprocket (90) being offset from an axis of the vertically extending pivot (42) between the front section and the rear sections (12, 40),
a means (80) for transmitting angular movement at a ratio of 1:1 and in a same direction, from the one or more front wheels (50) to the first sprocket (90),
a second sprocket (92) mounted on the rear section (12) of the fork truck lift coaxially of the axis of the vertically extending pivot (42) between the front and the rear sections (12, 40), and the second sprocket (92) being drivingly connected to a rotary sensor (100),
the first and the second sprockets (90, 92) being drivingly connected by a chain (96), and the first and the second sprockets (90, 92) having a drive ratio of 1:1.

* * * * *